Oct. 17, 1950     J. P. FRISCH     2,526,342
EDGE BONDING MACHINE
Filed Aug. 18, 1947     4 Sheets-Sheet 1
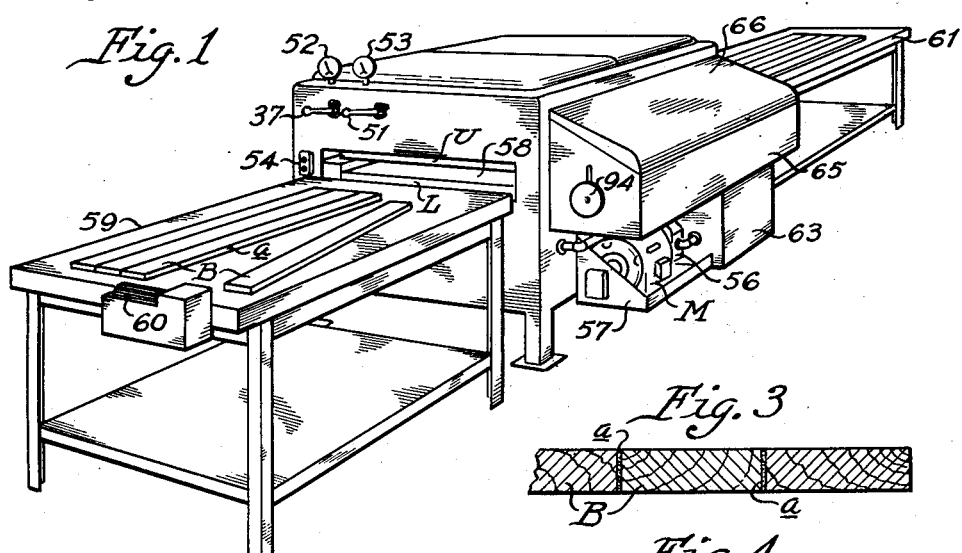
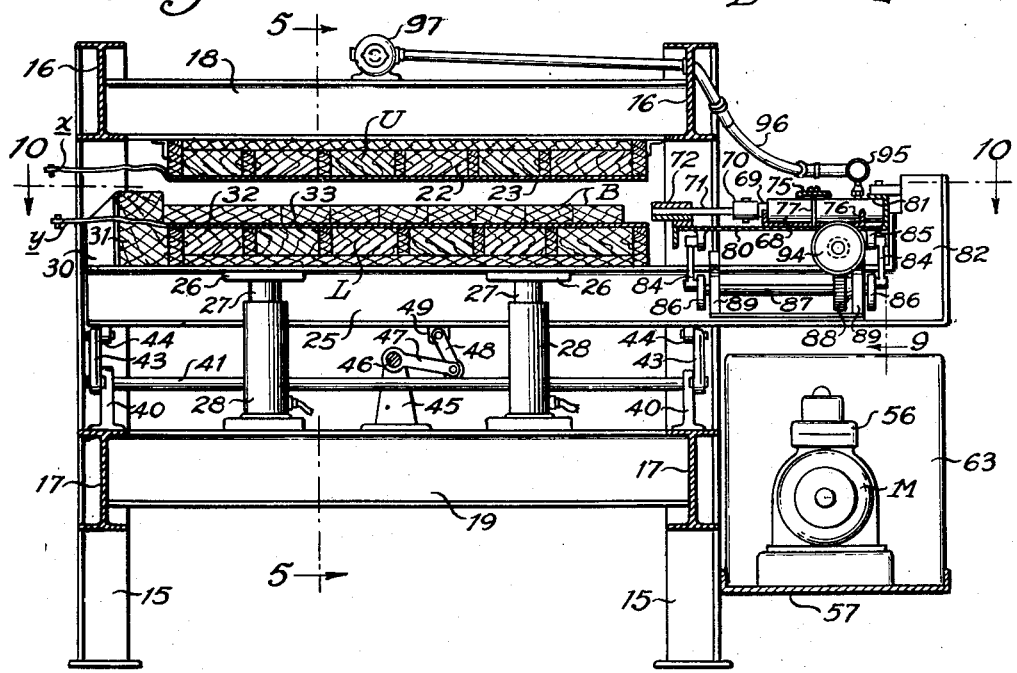
Inventor:
Joseph P. Frisch

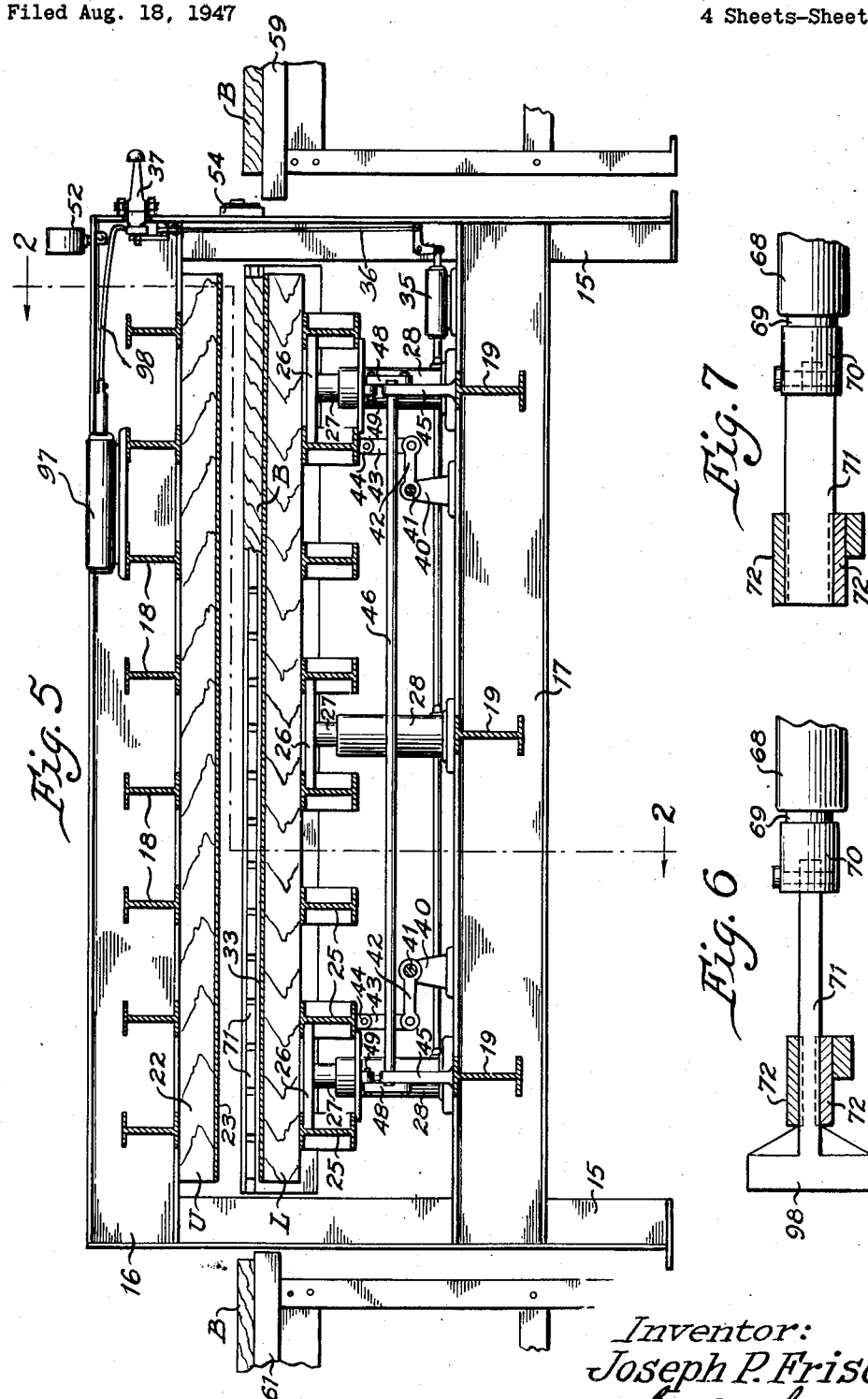

Oct. 17, 1950           J. P. FRISCH           2,526,342
EDGE BONDING MACHINE
Filed Aug. 18, 1947           4 Sheets-Sheet 3
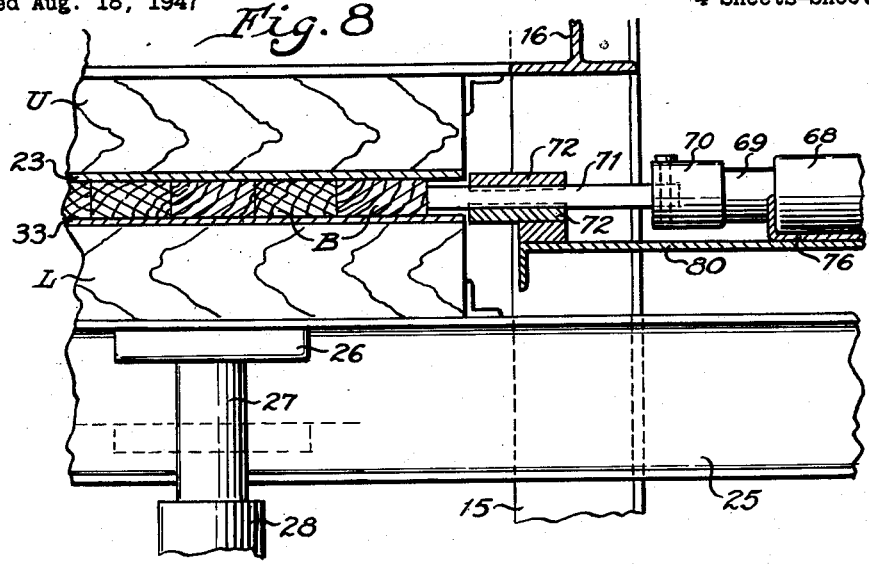
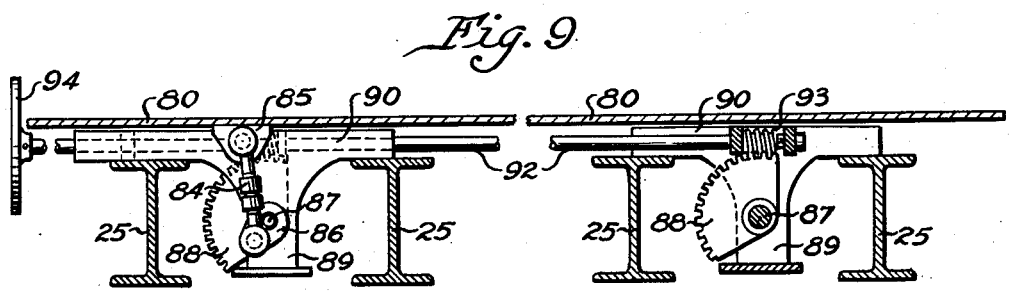
Inventor:
Joseph P. Frisch

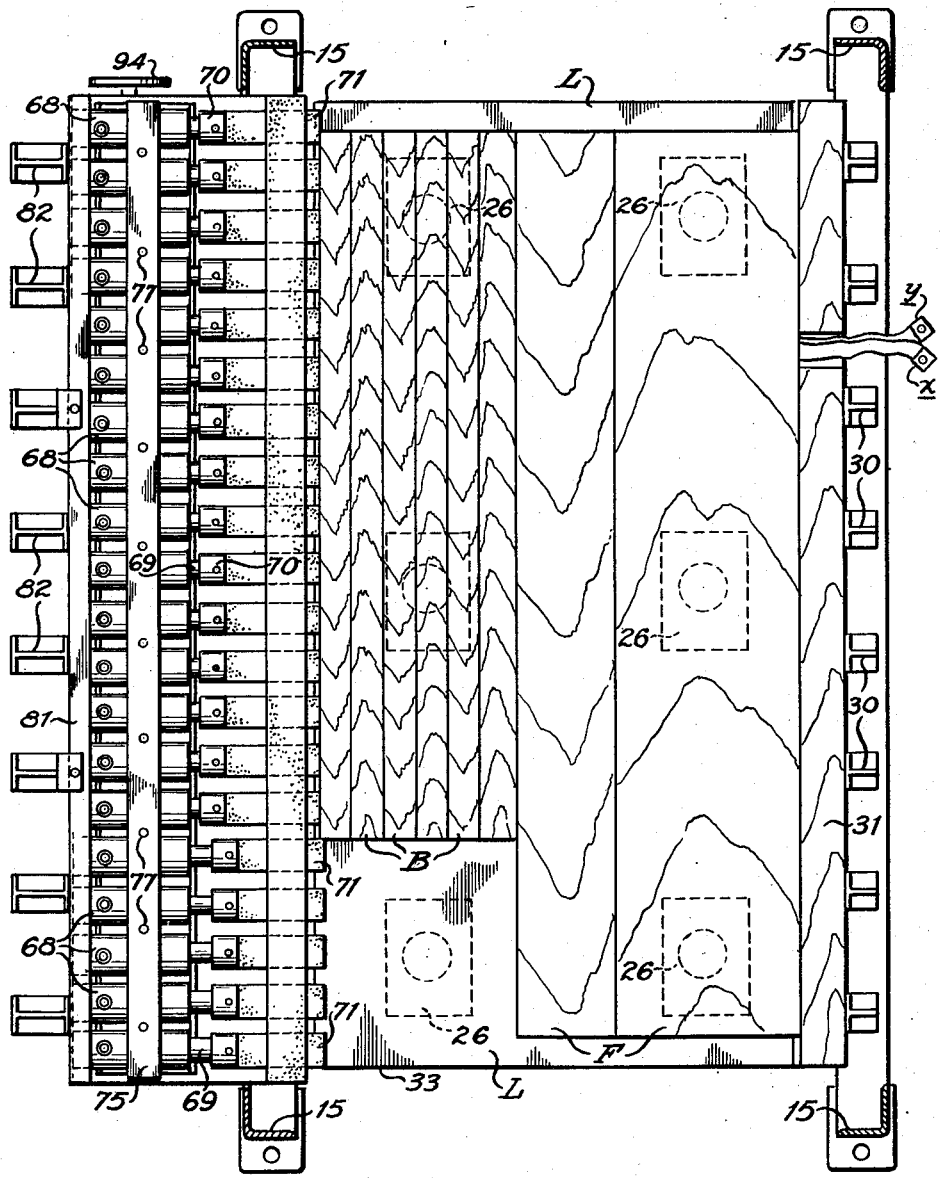

Patented Oct. 17, 1950

2,526,342

UNITED STATES PATENT OFFICE 2,526,342

EDGE BONDING MACHINE

Joseph P. Frisch, Chicago, Ill., assignor to Frisch Corporation, Chicago, Ill., a corporation of Illinois Application August 18, 1947, Serial No. 769,144

13 Claims. (Cl. 144—279)

My invention relates to a machine in which a number of boards, arranged edge to edge, may be compressed laterally as an incident to a bonding operation. A number of such boards, usually of an inferior grade of wood, are commonly bonded together to form a core over which a facing of plywood or veneer is applied. In this way it is feasible to build up large panels or slabs whose exposed surfaces display only fine grades of wood as selected. Panels of this character are used in countless places, such as in the manufacture of furniture, cabinets, wall panels, etc.

For its principal objects, my invention aims to produce a machine which will apply to a number of boards, while maintained in edge to edge relation, a uniform pressure at every point lengthwise thereof; which will operate upon boards of different or of varying thickness when arranged edge to edge; which will provide an accelerated setting of the adhesive used, with the aid of high frequency rays; which may be readily adjusted to meet conditions of varying sizes and thickness of panels, etc.; and which is equipped with controls that minimize the operations necessary for obtaining a complete bond between the contacting edges of the boards under treatment. These various objects, as well as other advantages and purposes which will hereinafter appear, may be realized by a machine which is constructed in general accordance with that shown in the accompanying drawings wherein:

Figure 1 is a view in perspective of the present bonding machine adjacent opposite ends of which are shown tables, one for supply and the other for delivery;

Fig. 2 is a vertical section through the machine, taken on line 2—2 of Fig. 5;

Fig. 3 is a fragmentary end elevation of a plurality of boards, arranged edge to edge with an adhesive therebetween, as when first introduced into the machine;

Fig. 4, which is a similar view, shows a similar arrangement of other boards of somewhat greater thickness;

Fig. 5 is a longitudinal section through the machine, taken on line 5—5 of Fig. 2;

Fig. 6, which is a detail in vertical section, shows one of the pusher bars and the cylinder mechanism associated therewith;

Fig. 7 is a similar view showing a pusher bar of modified form and size;

Fig. 8 is a detail in vertical section, somewhat enlarged, showing a plurality of boards between the two platens as they appear when engaged by both platens preliminary to receiving lateral pressure from the battery of pusher rods;

Fig. 9 is a detail in vertical section, taken on line 9 of Fig. 2; and

Fig. 10 is a horizontal section through the machine, taken on line 10—10 of Fig. 2.

The machine of this invention is sturdily built to withstand the heavy reaction pressures which are developed in operation. For this purpose I may employ vertical uprights 15 in the form of angle bars at each corner to form supporting legs for the machine in its entirety. Interconnecting these uprights are upper and lower longitudinal beams 16 and 17, respectively, which are disposed along opposite sides of the machine. Upper and lower sets of cross beams 18 and 19, respectively, are extended between the beams 16 and 17 to complete the structure framework. The number of cross beams 18 at the top is shown as eight, so that their spacing apart is close as compared with the lower cross beams 19 which are fewer in number (see Fig. 5). All of the beams just noted may be of I-cross section, and are interconnected fixedly to each other and to the legs as by welding.

Affixed to the under side of the cross beams 18 is a stationary upper platen U which may comprise a body framework of connected wooden pieces 22 supporting a metallic plate 23 across the bottom. A cooperating lower platen L of similar construction is adapted for vertical movement toward and from the fixed upper platen U. The movable lower platen L is supported upon a vertically movable platform of interconnected cross beams 25 which, as shown in Fig. 5, correspond in number and position to the cross beams 18 at the top. This platform is rested upon a plurality of head plates 26 carried by plungers 27 which operate in cylinders 28 that are based upon certain of the lower beams 19 already described. The platform provided by the cross beams 25 is extended out beyond one side of the press for a purpose which will presently appear. Rising from the opposite side of the supporting platform is a plurality of abutment posts 30 against which is positioned a thrust block 31. The lower platen L which rises and falls with operation of the several cylinder mechanisms comprises a metallic plate 33 across the top, the construction being much the same as that already described in connection with the fixed upper platen U.

A hydraulic system the details of which need not be described here interconnects all the cylinders 28 so that they will operate in unison. The number of cylinders employed will depend upon the size of the platen L to be operated, six being shown in the drawings. A valve 35 operable as by a push rod 36 is connected to a control lever 37 at the front of the machine. With manipulation of the valve which is interposed in the hydraulic system fluid pressure becomes effective to raise all the plungers 27 in unison so that the movable lower platen L is advanced upwardly toward the fixed platen U. By a further manipulation of the control valve this pressure may be released to permit lowering of the platform and platen L carried thereby.

So that the advance of the movable lower platen may be uniform at every point, I provide an equalizing mechanism. This may take the form of two pairs of oppositely disposed brackets 40 mounted on lower beams 17, and providing bearings in which may be journaled a cross shaft 41 which carries at each of its opposite ends a crank arm 42 having a link connection 43 with a lug 44 that depends from the proximate cross beam 25 of the movable platform. By the means described, opposite ends of the moving platen will be constrained to move evenly. A second equalizer similar in construction is also provided to assure an even advance of opposite sides of the platen. For this purpose I may employ two pairs of opposing brackets 45 one supported upon an end beam 19 at each end, a shaft 46 being extended between the two brackets and journaled for rotation therein; each end of this shaft carries a crank arm 47 in link connection 48 with a lug 49 which depends from one of the cross beams 25 supporting the movable platform. In the normal course of operation, no attention need be paid to the equalizing mechanism since it is automatic in controlling movements of the lower platen L which is thereby maintained horizontal at all times and in all positions of adjustment.

Referring now to Fig. 1, the framework of the machine which supports the various operating mechanisms may be enclosed so as to present a cabinet appearance. At its front, so as to be convenient for operation, is the control lever 37 with a second lever 51 adjacent thereto for controlling the admission of fluid under pressure to a second hydraulic system shortly to be described. Pressure gauges 52 and 53 for each hydraulic system may be arranged on the top of the cabinet so that the operator will be apprised at all times of the pressure conditions available to him in the operation of the machine. A switch 54 is also mounted on the front of the machine, convenient for operation, to control the circuit leading to a motor M in connection with a hydraulic pump 56 both mounted upon a shelf 57 that is affixed to one side of the machine. An elongated slot 58 is provided in the front of the cabinet at an elevation which is about even with the movable platen L when in a lowered position. In front of the machine is a supply table 59 mounting a pot for glue $a$ or other adhesive in which dips a roller 60 for transferring the glue to the edges of boards B which are slid thereover when being placed on the table preliminary to being advanced endwise through the slot 58 to an operative position upon the lower platen L. At the opposite end of the machine is a similar wide slot (not shown) with a delivery table 61 positioned immediately therebeyond. At the conclusion of each edge bonding operation, the several boards, the united into a slab, may be pushed out from the machine and on to the delivery table 61 from whence removal to another station may take place.

The hydraulic pump 56 is in operative connection with a tank 63 containing oil or other fluid which is to be circulated under pressure through the two hydraulic systems already noted. The cylinder mechanisms in one system operate vertically to move the platen L whereas the cylinder mechanisms in the other system operate horizontally to apply lateral pressure to the boards under treatment. Above the motor, pump, and tank I provide a box 65 having a hinged cover 66 which, when opened, will expose to view and render accessible for service attention the battery of horizontal cylinder mechanisms now to be described.

The horizontal cylinders 68 which are arranged side by side extend lengthwise of the machine in a single row. The plunger 69 of each cylinder carries a head 70 to which is secured one end of a pusher bar 71 whose cross section is generally rectangular. Each pusher bar is mounted to move in a horizontal plane, its acting end, when retracted, being disposed just outside the confines of the two platens so as to avoid interference therewith. Each pusher bar 71 is made of some material having a high insulating value, such as formica, and is slidably fitted between upper and lower guides 72 which extend lengthwise of the machine. These guides, which may also be made of formica, are transversely channeled so as to confine the movements of the pusher bars to a straight line. With each plunger 69 may be associated a spring (not shown) to return the plunger to its retracted position when pressure is cut off, such an arrangement being common in cylinder mechanisms of the kind under description.

The pusher bar cylinders 68 are interconnected, as by a head bar 75 along the top. In addition the cylinders are mounted on their under sides upon a cradle bar 76 which extends for the length of the machine, a plurality of bolts 77 extending between the head and cradle bars 75 and 76 to press one toward the other and against the cylinders 68 therebetween. The cradle bar is supported upon a base member 80 which also underlies the guides 72 so as to provide a common support therefor. Along its outer side the base member is extended upwardly and then inwardly to provide a flange 81, the outer ends of the cylinders 68 being received within the channel thus formed.

The platform provided by the cross beams 25 is extended outwardly beyond one side of the machine (see Fig. 2) to underlie the battery of horizontal cylinders in spaced relation thereto. At the outer extremity of each such cross beam 25 is an upright abutment post 82 with which the channeled base member 80 abuts. This base member, together with the cylinder mechanisms supported thereon, is adjustably supported upon a plurality of thrust links 84, each in pivotal connection at the top with a lug 85 depending from the base member 80 (see Fig. 9) and at the bottom with a crank arm 86 that is fast on one end of a jack shaft 87 whereon is keyed a gear 88. Each jack shaft of which two are shown is journaled for rotation in a pair of spaced hangers 89 which depend from a bearing plate 90 that is fixedly supported between and by two adjacent cross beams 25. Two bearing plates 90 disposed in spaced relation endwise of the machine provide supports for a common operating shaft 92 mounting a pair of worms 93 in mesh with the gears 88, and at one end a hand wheel 94 which is positioned exteriorly of the box 65. By operating this wheel the gears 88 are rotated slightly whereby to transmit through the links 84 a lowering or raising movement to the base member 80, the vertical position of the battery of cylinders 68 being adjusted as required for boards of various thicknesses. These cylinders are interconnected by a manifold pipe 95 from which is extended a flexible connection 96 to a valve 97 which controls the admission of fluid pressure thereinto and release therefrom. This valve is in connection, as by the rod 98, with the control lever 51 so as to be operable thereby. Since motion is communicated concurrently to both jack shafts 87 by operation of the common shaft 92, the base member 80 is raised or lowered uniformly at its opposite ends thereby assuring maintenance of a horizontal position of the pusher bar unit at all times.

In operation the boards to be joined into a core are coated along their edges with an appropriate adhesive for the purpose. They are slid upon the lower platen L in position to be operated upon. Fluid under pressure is then admitted to the cylinders 28 comprised in the first hydraulic system to cause the lower platen to be raised a distance sufficient to produce contact between the top edges of the boards and the upper platen U. Fluid pressure is then admitted to the horizontal cylinders 68 comprised in the second hydraulic system, as by operation of the control lever 51. The pusher bars are then advanced in unison so as to engage the edge of the proximate board. Advance of the pusher bars will continue in response to the fluid pressure whose full force may be exerted within the cylinders 68 during this operation. Each bar operates independently of the others so that if there be any unevenness in any board, lengthwise thereof, this factor of irregularity will not prevent a uniform application of pressure at every point lengthwise of the entire core then being made. The pressure upon the top and bottom surfaces of the core is maintained with sufficient lightness to permit the boards to be pushed freely, one against another. At or about this time high frequency rays are transmitted from suitable apparatus to leads $x$ and $y$ in connection, respectively, with the upper and lower platen plates 23 and 33 to operate upon the boards and accelerate the curing of the adhesive between the edges. As a result, the entire operation may be completed in a matter of seconds following which the high frequency rays are cut off, and the pressures are released to permit the operator to slide the entire core of bonded boards out from between the two platens on to the delivery table 61.

The boards to be united in a single operation may vary widely in length and width, and other loose boards F to serve as fillers may be fitted into the space between the core-to-be and the thrust block 31 (see Fig. 10). It is unnecessary to provide any resistance for the pusher bars beyond the ends of the boards to be bonded— they will simply advance to their limit without performing any work, and then retract again to a ready position for the next operation. These pusher bars may be relatively flat in horizontal or vertical planes, as indicated in Figs. 6 and 7, respectively, and may, if desired, be equipped with pressure heads 98 whereby to engage the work over a wider area of its surface. Various modifications in details of this kind may be made according to the conditions encountered in operation.

I claim:

1. An edge bonding machine in which is comprised a framework mounting a fixed platen, a vertically movable platform vertically opposite the fixed platen and extended laterally outwardly clear of one side thereof, a second platen carried by the platform for movement therewith toward and from the fixed platen to coact therewith in engaging work positioned therebetween, means for raising and lowering the platform, a base member arranged along the lateral extension of the platform, a plurality of horizontal cylinder mechanisms carried by the base member in side-by-side relation, a pusher bar affixed to each cylinder mechanism in a position to be advanced into the space between the two platens, vertically adjustable supporting means extending between the base member and the platform whereby to shift the vertical positions of the horizontal cylinder mechanisms as a unit independently of adjustments in the vertical position of the platform, and a hydraulic system in connection with each cylinder mechanism for operating the same whereby to advance or retract the pusher bars in unison toward or from the work held between the platens.

2. An edge bonding machine as defined in claim 1, wherein there is comprised along the laterally extended side of the platform a plurality of abutment posts against which the base member is arranged to transmit thereto reactive forces from the horizontal cylinder mechanisms.

3. An edge bonding machine as defined in claim 1 wherein there is comprised a plurality of aligned hangers supported by the platform adjacent its laterally extended side together with adjustable supporting links extending from the hangers to the base member whereby the latter may be raised or lowered independently of the platform.

4. An edge bonding machine as defined in claim 1 wherein there is comprised hangers supported by the platform adjacent its laterally extended side, an adjusting shaft journaled for rotation in the hangers and mounting at one end a hand wheel, jack shafts journaled for rotation in the hangers each having a crank and link connection with the base member thereabove, and worm gear connections between the adjusting shaft and jack shafts whereby, in response to rotation of the hand wheel, the links are raised or lowered to transmit a corresponding movement to the base member and cylinder mechanisms supported thereby.

5. An edge bonding machine in which is comprised a framework mounting a fixed platen, a vertically movable platform vertically opposite the fixed platen and extended laterally outwardly clear of one side thereof, a second platen carried by the platform for movement therewith toward and from the fixed platen to coact therewith in engaging work positioned therebetween, means for raising and lowering the platform, a plurality of horizontal cylinder mechanisms carried by the platform in side-by-side relation, a pusher bar affixed to each cylinder mechanism in a position to be advanced into the space between the two platens, vertically adjustable supporting means for all the cylinder mechanisms whereby to shift the vertical positions thereof as a unit independently of adjustments in the vertical position of the platform, and a hydraulic system in connection with each cylinder mechanism for operating the same whereby to advance or retract the pusher bars in unison toward or from the work held between the platens.

6. An edge bonding machine in which is comprised a framework mounting a fixed upper platen, a vertically movable platform below the fixed upper platen and extended laterally beyond one side thereof, a lower platen carried by the movable platform for movement therewith toward and from the fixed platen, abutment means carried along opposite sides of the movable platform one outwardly beyond the upper platen, vertical cylinder mechanisms carried by the machine framework in operative connection with the lower platen to impart raising and lowering movements thereto, means for equalizing the vertical movements of the lower platen, a hydraulic system common to the vertical cylinder mechanisms for operating the same in unison, a battery of side-by-side horizontal cylinder mechanisms adjacent the platform abutment means outwardly beyond the two platens, a pusher bar affixed to each horizontal cylinder mechanism for movement into the space between the platens, means adjustably supporting the battery of horizontal cylinder mechanisms and pusher bars as a unit on the platform whereby to vary their vertical positions relative thereto, a second hydraulic system common to the horizontal cylinder mechanisms for operation the same in unison but each independently of the others, and separate means for controlling the admission of fluid pressure into the two hydraulic systems whereby to independently operate the lower platen and pusher bars.

7. An edge bonding machine as defined in claim 6 wherein the abutment means carried along the laterally extended side of the platform comprises a base member and a plurality of abutment posts against which the base member is slidingly arranged to transmit thereto reactive forces from the horizontal cylinder mechanisms.

8. An edge bonding machine in which is comprised a framework mounting a fixed upper platen, a vertically movable platform below the fixed upper platen and extended laterally beyond one side thereof, a lower platen opposite the fixed upper platen carried by the platform for movement therewith toward and from the fixed platen, vertical cylinder mechanisms carried by the machine framework in operative connection with the platform to impart raising and lowering movements thereto, means for equalizing the vertical movements of the platform, a hydraulic system common to the vertical cylinder mechanisms for operating the same in unison, a battery of side-by-side horizontal cylinder mechanisms carried by the platform outwardly beyond the two platens, a pusher bar affixed to each horizontal cylinder mechanism for movement into the space between the platens, means adjustably supporting the battery of horizontal cylinder mechanisms and pusher bars as a unit on the platform whereby to vary their vertical positions relative thereto, a second hydraulic system common to the horizontal cylinder mechanisms for operating the same in unison but each independently of the others, and separate means for controlling the admission of fluid pressure into the two hydraulic systems whereby to independently operate the lower platen and pusher bars.

9. An edge bonding machine in which is comprised a framework mounting a fixed upper platen, a vertically movable platform below the upper platen and extended laterally outwardly clear of one side thereof, a lower platen carried by the platform for movement therewith toward and from the fixed platform, means for raising and lowering the platform, a base plate arranged along the lateral extension of the platform, a plurality of horizontal cylinder mechanisms carried by the base plate in side-by-side relation, a pusher bar affixed to each cylinder mechanism in a position to be advanced into the space between the two platens, means adjustably supporting the base plate upon the platform whereby the vertical positions of the horizontal cylinder mechanisms may be shifted as a unit independently of adjustments in the vertical position of the platform, abutment means carried by the platform in operative relation with the cylinder mechanisms thereon to resist reaction of each thereof, and a hydraulic system in connection with each cylinder mechanism for operating the same whereby to advance or retract the pusher bars in unison.

10. An edge bonding machine in which is comprised a framework mounting a fixed upper platen, a vertically movable platform below the upper platen and extended laterally outwardly clear of one side thereof, a lower platen carried by the platform for movement therewith toward and from the fixed platform, means for raising and lowering the platform, a base plate arranged along the lateral extension of the platform, a plurality of horizontal cylinder mechanisms carried by the base plate in side-by-side relation, a pusher bar affixed to each cylinder mechanism in a position to be advanced into the space between the two platens, means adjustably supporting the base plate upon the platform whereby the vertical positions of the horizontal cylinder mechanisms may be shifted as a unit independently of adjustments in the vertical position of the platform, and a hydraulic system in connection with each cylinder mechanism for operating the same whereby to advance or retract the pusher bars in unison.

11. An edge bonding machine in which is comprised a framework mounting a fixed upper platen, a vertically movable platform below the fixed platen and extended laterally beyond one side thereof, a lower platen carried by the movable platform for movement therewith toward and from the fixed platform to coact therewith in engaging work positioned therebetween, means for raising and lowering the platform, a plurality of horizontal cylinder mechanisms in side-by-side relation carried by the platform along its side which is extended laterally beyond the platens, a pusher bar affixed to each cylinder mechanism in a position to be advanced into the space between the two platens, means for raising and lowering the horizontal cylinder mechanisms in unison relative to the platform whereon they are mounted, and a hydraulic system in connection with each cylinder mechanism for operating the same whereby to advance or retract the pusher bars in unison toward or from the work held between the platens.

12. An edge bonding machine as defined in claim 11 wherein there is provided a common base member for support of the horizontal cylinder mechanisms and pusher bars connected thereto, and a combined equalizing and vertically adjusting supporting means for the base member whereby the elevation of the cylinder mechanisms and the pusher bars carried thereby may be varied relative to the platform.

13. An edge bonding machine in which is comprised a framework mounting a fixed horizontal platen, a vertically movable horizontal platform opposite the fixed platen and extended laterally beyond one side thereof, a second platen carried by the platform for movement therewith toward and from the fixed platen to coact therewith in engaging work positioned therebetween, means for raising and lowering the platform, a plurality of cylinder mechanisms carried by the platform in side-by-side relation, means interconnecting the cylinder mechanisms in unitary relation, a common abutment for the cylinder mechanisms to oppose reactive movement thereof, a plurality of horizontal pusher bars in side-by-side relation extended from the cylinder mechanisms toward the space between the two platens adapted to be advanced endwise thereinto, guiding means for the pusher bars mounted on the platform adjacent the sides of the two platens, the guiding means extending crosswise of a plurality of pusher bars and provided at spaced intervals with transverse channels each to receive and guide one pusher bar in its endwise movements, and a hydraulic system in connection with each cylinder mechanism for operating the same whereby to advance or retract the guided pusher bars in unison toward or from the work held between the two platens.

JOSEPH P. FRISCH.

REFERENCES CITED

The following references are of record in the file of this patent:

UNITED STATES PATENTS

| Number | Name | Date |
|---|---|---|
| 471,909 | Still | Mar. 29, 1892 |
| 965,927 | Nichols | Aug. 2, 1910 |
| 1,693,606 | Jones | Dec. 4, 1928 |
| 1,873,818 | Burns | Aug. 23, 1932 |
| 2,094,862 | Welch | Oct. 5, 1937 |
| 2,366,588 | Bolling | Jan. 2, 1945 |
| 2,453,185 | Bilhuber | Nov. 9, 1948 |

FOREIGN PATENTS

| Number | Country | Date |
|---|---|---|
| 24,258 | Great Britain | Oct. 22, 1909 |